United States Patent
Mohandas (10) Patent No.: US 7,756,136 B2
(45) Date of Patent: Jul. 13, 2010

(54) SPATIAL AND TEMPORAL LOSS DETERMINATION IN PACKET BASED VIDEO BROADCAST SYSTEM IN AN ENCRYPTED ENVIRONMENT

(75) Inventor: Praveen A. Mohandas, Thousand Oaks, CA (US)

(73) Assignee: Cheetah Technologies, L.P., Pittsburgh, PA (US)

( * ) Notice: Subject to any disclaimer, the term of this patent is extended or adjusted under 35 U.S.C. 154(b) by 147 days.

(21) Appl. No.: 12/034,493

(22) Filed: Feb. 20, 2008

(65) Prior Publication Data

US 2008/0137667 A1 Jun. 12, 2008

Related U.S. Application Data

(63) Continuation-in-part of application No. 11/456,505, filed on Jul. 10, 2006.

(60) Provisional application No. 60/891,084, filed on Feb. 22, 2007.

(51) Int. Cl.
*H04L 12/28* (2006.01)
*H04L 12/56* (2006.01)
*G02F 1/35* (2006.01)
*G02F 2/02* (2006.01)

(52) U.S. Cl. .................................................. 370/395

(58) Field of Classification Search ................ 370/395, 370/394, 485, 538, 466, 471; 725/21, 30, 725/37, 39, 105, 107, 118, 51, 87, 112, 136; 455/466; 726/21; 348/725; 341/87; 714/776; 702/69; 359/237, 245, 252; 340/562, 657; 375/240

See application file for complete search history.

(56) References Cited

U.S. PATENT DOCUMENTS

| 5,115,309 A | 5/1992 | Hang |
| 5,686,964 A | 11/1997 | Tabatabai et al. |
| 6,654,416 B1 | 11/2003 | Alexandre et al. |

(Continued)

FOREIGN PATENT DOCUMENTS

WO 0180492 A2 10/2001

(Continued)

OTHER PUBLICATIONS

N. Mohsenian, R. Rajagopalan, and C.A. Gonzales; Single-pass constant-and variable-bit-rate MPEG-2 video compression; IBM Journal of Research and Development; vol. 43, No. 4, 1999.

(Continued)

*Primary Examiner*—Pankaj Kumar
*Assistant Examiner*—Prenell P Jones
(74) *Attorney, Agent, or Firm*—Kelly Lowry & Kelley, LLP (57) ABSTRACT

A method for determining spatial and temporal loss in a packet based video broadcast system in an encrypted environment involves measuring video coding layer information at an unencrypted head end of a video stream and network layer information at an encrypted downstream end of the same video stream. Video coding layer information is correlated with network layer information having a corresponding time stamp to compute the spatial and temporal loss. The video coding layer and network layer information is taken from discrete segments of the video stream including access units, slices or macroblocks. Impairments in the video stream are determined using the computed spatial and temporal loss.

25 Claims, 5 Drawing Sheets

U.S. PATENT DOCUMENTS

| | | |
|---|---|---|
| 6,741,569 B1 | 5/2004 | Clark |
| 7,058,048 B2 | 6/2006 | Clark |
| 7,075,981 B1 | 7/2006 | Clark |
| 7,085,322 B2 | 8/2006 | Ngai et al. |
| 7,116,717 B1 | 10/2006 | Eshet et al. |
| 7,142,599 B2 | 11/2006 | Henocq |
| 7,307,781 B1 * | 12/2007 | Chang et al. ................. 359/326 |
| 7,355,530 B2 | 4/2008 | Labelle |
| 2003/0121053 A1 * | 6/2003 | Honda ........................ 725/107 |
| 2003/0149930 A1 * | 8/2003 | Rey et al. ................... 714/776 |
| 2004/0062313 A1 | 4/2004 | Schoenblum |
| 2004/0156438 A1 | 8/2004 | Choi |
| 2004/0184529 A1 | 9/2004 | Henocq et al. |
| 2005/0175091 A1 | 8/2005 | Puri et al. |
| 2005/0276284 A1 * | 12/2005 | Krause et al. ............... 370/538 |
| 2006/0268701 A1 | 11/2006 | Clark |
| 2006/0276983 A1 * | 12/2006 | Okamoto et al. .............. 702/69 |
| 2007/0009045 A1 * | 1/2007 | Mohandas ............. 375/240.25 |
| 2007/0140134 A1 | 6/2007 | Clark |
| 2008/0129560 A1 * | 6/2008 | Baraniuk et al. ............... 341/87 |
| 2008/0137667 A1 * | 6/2008 | Mohandas ............. 370/395.64 |
| 2008/0216116 A1 * | 9/2008 | Pekonen et al. ................ 725/39 |

FOREIGN PATENT DOCUMENTS

| | | |
|---|---|---|
| WO | 0191343 A2 | 11/2001 |
| WO | 2006069219 A2 | 6/2006 |
| WO | 2007075918 A2 | 7/2007 |

OTHER PUBLICATIONS

Hongtao Yu, Zhiping In, Senior Member, IEEE and Feng Pan, Senior Member, IEEE; Applications and Improvement of H.264 in Medical Video Compression; IEEE Transactions on Circuits and Systems-I; Regular Papers, vol. 52, No. 12, Dec. 2005; pp. 2707-2716.

* cited by examiner

SPATIAL AND TEMPORAL LOSS DETERMINATION IN PACKET BASED VIDEO BROADCAST SYSTEM IN AN ENCRYPTED ENVIRONMENT

BACKGROUND OF THE INVENTION

The present invention relates generally to packet based video broadcast systems. More particularly, the present invention pertains to methods of estimating the extent of loss of video coding layer information and their impact in a series of images in an encrypted video stream that uses MPEG2/4/H.264-AVC compatible encoding.

In typical broadcast systems, such as in IPTV (Internet Protocol Television) and direct broadcast satellite (DBS) applications, multiple video programs are encoded in parallel, and the digitally compressed bitstreams are multiplexed onto a single, constant or variable bit rate channel. The video coding layer (MPEG2/H.264-AVC) is typically packetized into small fixed-size packets (MPEG2 Transport Stream) before transmission to an IP network. Typical packet losses in an IP network could follow various loss distributions where each loss event could be single, consecutive or sparse burst losses. This loss will result in a discard of a frame, slice or macroblock/s at the video coding layer. These macroblocks could either be INTER or INTRA predicted and could be part of the reference frame list, in which case the temporal duration of the loss could extend for a few frames in sequence.

Just measuring the packet loss rate at the IP level is insufficient to determine the loss propagation at the video content layer. The visual impact of IP packet loss must be determined by analyzing the loss propagation at the video content layer. In addition, coding quality is largely dependent on the quantization errors, the distribution of quantization at each macroblock determines the coding quality, the higher the quantization, the higher the loss of DCT coefficients, that results in low image quality. In an encrypted environment all the information that is needed to determine the spatial and temporal extent of the propagation of errors and quantization data is unavailable. Typically, the transport stream payload is encrypted. This payload contains the information about the video coding layer information at various sections, frames, slices and macroblocks. What is needed is a method to determine this information when the video stream monitored by the measurement device is encrypted.

Figure 1:
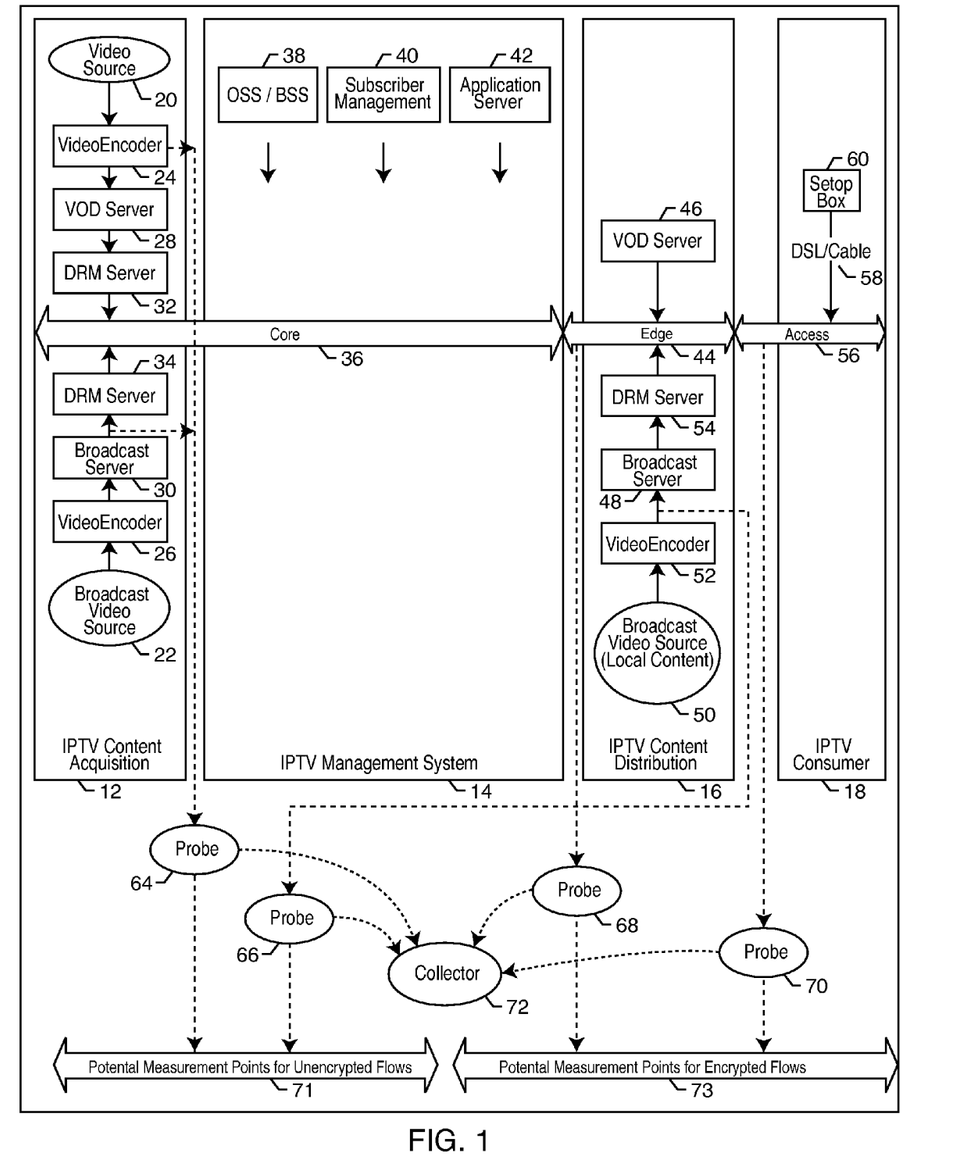
FIG. 1 shows an example of an IPTV (IP television) distribution network with potential points where measurements.

MPEG encoded variable bit rate (VBR) video traffic is expected to dominate the bandwidth of broadband networks. Such traffic can be delivered in streaming, on demand, IPTV or DBS types of environments. Accurate models must take into account both capped VBR or CBR types of environment, video complexity and spatial/temporal propagation of errors under various loss distribution patterns. These parameters are necessary to enable monitoring systems for prediction of performance of any proposed network during its operation. FIG. 1 shows components that are involved in delivering video content in a typical IPTV environment. Video source that originates as analog signal is encoded using an encoder and packetized and sent using an IP network. It could be sent as multicast or unicast destination to the network. The core contains various elements to provision and manage subscribers and traffic flows. The content is stored in content servers and delivered to the user on demand.

Figure 2:
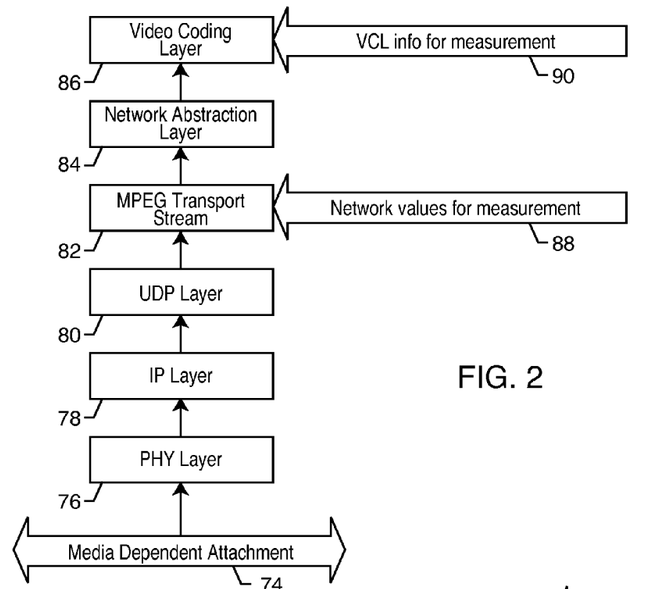
FIG. 2 shows a typical protocol stack where Video Coding Layer content is encapsulated in IP/UDP/MPEG2TS and values for both Network and Video Coding Layer statistics are extracted.

MPEG coding standards define timing information at various sections in a video that is used by the Video decoding process. FIG. 2 shows the packet layers where this timing information is present. There is a single, common system clock in the encoder. This clock is used to create timestamps that indicate the correct presentation and decoding timing of audio and video, as well as to create timestamps that indicate the instantaneous values of the system clock itself at sample intervals. The timestamps that indicate the presentation time of video and audio are called Presentation Timestamps (PTS). Timestamps that indicate the decoding time are called Decoding Timestamps (DTS). Those timestamps that indicate the value of the system clock are called Program Clock Reference (PCR) in transport streams.

Accordingly, what is needed is a process to analyze video timing information at the head end and down stream (IPTV content distribution site as in FIG. 1), and correlate information from the head end to the down stream video sample instance. The present invention fulfills these needs and provides other related advantages.

SUMMARY OF THE INVENTION

The present invention provides a method for estimating loss of Video Coding Layer information in real time. This is accomplished by the analysis of video timing from the unencrypted head end and encrypted down stream of the video stream, and correlating the information at a collection location. Once this information is determined, the effects of a loss/loss distribution event of an IP packet is are computed by determining the spatial and temporal extent of the video content loss. Quantization data and its distribution can also be determined by this method.

A process for determining spatial and temporal loss in a packet based video broadcast system in an encrypted environment involves collecting video coding layer information with a corresponding time stamp at an unencrypted head end of a video stream and simultaneously collecting network layer information with a corresponding time stamp at an encrypted downstream end of the video stream. The video coding layer information is correlated with the network layer information using the respective time stamps. Spatial and temporal loss in the video stream from the head end to the downstream end is computed using the correlated information.

The process includes the step of gathering information and parameters corresponding to discreet sections of the video stream during each of the collecting steps. The discreet sections of the video stream include access units, slices or macroblocks. The parameters in each access unit include correlation time, picture resolution, sequence number or instantaneous decoder refresh number. The parameters in each slice include slice identification, slice type or sequence number. The parameters in each macroblock include macroblock type, macroblock size, sequence number, reference index or loss flag.

The step of simultaneously collecting network layer information further includes the step of creating a statistical model representing packet loss distribution information for a loss event in the video stream.

The computing step also includes computing spatial and temporal loss duration, and slices or macroblocks affected by the loss event. The computing step further comprises the step of computing impairments in the video stream using the computed spatial and temporal loss. The computing step also includes mapping the video coding layer information and the network layer information to match IP/port data from the downstream end to the head end of the video stream, maintaining an access unit list and an associated reference picture list at an unencrypted status event, locating a match between the list of access units and an encrypted status event, and identifying lost packets in discreet sections of the access unit list and the associated reference picture list.

Other features and advantages of the present invention will become apparent from the following more detailed description, taken in connection with the accompanying drawings which illustrate, by way of example, the principals of the present invention.

BRIEF DESCRIPTION OF THE DRAWINGS

The accompanying drawings illustrate the invention. In such drawings.

DETAILED DESCRIPTION OF THE PREFERRED EMBODIMENT

The present invention relates to a method of estimating video coding layer information in a series of images in a video stream supporting MPEG2/4/H.264-AVC type of picture encoding, includes creating, during a flow of encoded video stream, statistics on video coding layer information at the head end, storing the prediction and motion information of macroblocks that pertains to a access unit/slice and available timing information (PCR) and transmitting the factors and timing to the collector. At the same time at the down stream end creating, during a flow of encoded video stream a statistical model representing the packet loss distribution information, storing the loss factors and timing information that is available—RTP/PCR/PTS, DTS or Statistics generation time and transmitting the factors and timing to the collector. The collector then correlates the Video Coding Layer sections information with the Network Layer information utilizing this timing information originating from head end and down stream locations.

As described below, the inventive method can provide image complexity measurements for industry wide video quality assessment models. One such model is described in U.S. patent application Ser. No. 11/456,505 filed on Jul. 10, 2006 entitled Image Complexity Computation in Packet-Based Video Broadcast Systems, the contents of which are incorporated by reference.

The present method provides a distributed system to estimate perceived video quality in an encrypted environment. The method allows collectors to get Video Coding Layer parameters and compute image complexity values from distributed remote probes analyzing video in an encrypted environment. The method facilitates computation of impairments in a packetized video stream using spatial and temporal statistics from the video content to more accurately measure perceived video quality. The method also provides image complexity at regular intervals for packetized video applications and an estimation on video complexity as perceived by a human visual system. Further, the method provides image complexity measurements for typical industry wide video quality assessment models, including and not limited to Peak Signal to Noise Ratio (PSNR), MPQM, MQUANT and Root Mean Square Error (RMSE), as well as offline and real time image complexity measurements that can be used or incorporated by video encoders, multiplexers, routers, VOD servers (video on demand), broadcast servers and video quality measurement equipments.

The method determines the spatial extent of loss for INTRA predicted frames when the payload associated with the spatial information is encrypted. The method also determines the temporal propagation of loss, utilizing the INTER prediction information in a series of coded image when the payload associated with the temporal information is encrypted. The method also determines the percentage of access units that are affected by a packet loss in an encrypted environment.

A preferred embodiment of the present invention is illustrated in FIGS. 1-7. An embodiment of the present invention can be utilized in an IPTV delivery system such as that illustrated in FIG. 1.

FIG. 1 shows a typical IPTV distribution network 10 that includes IPTV Content Acquisition 12, IPTV Management System 14, IPTV Content Distribution 16 and IPTV Consumer 18. Video Source 20, 22 is usually acquired in analog form and encoded in MPEG 1/2/4 format by a video encoder 24, 26 and sent to either a Video on Demand (VOD) server 28 or a Broadcast server 30. The stream originating from the VOD or Broadcast servers 28, 30 may be encrypted by a DRM server 32, 34. The servers 28, 30 encapsulate the content into a program stream for transport to a network core 36. When used, the DRM servers 32, 34 encrypt the encapsulated content from the servers 28, 30 and then pass it on to the network core 36. The network core 36 is a relatively higher bandwidth pipe.

An IPTV network 10 also includes a variety of management, provisioning and service assurance elements. The IPTV Management System 14 includes an Operation Support System (OSS) 38, a Subscriber management system 40 and Application Servers 42 to create new value added services. At the edge of the server 44, the content is stored in VOD Server 46 or Broadcast Server 48 that is located close to the consumer. The Broadcast Server 48 can also received local content from Broadcast Video Source 50 which is encoded in MPEG 1/2/4 format by Encoder 52. Here again a DRM Server 54 can encrypt the transport stream output from the Broadcast Server 48. A consumer accesses the content through a broadband access line 56, which is preferably a Cable/DSL line 58. A television is typically connected to a set-top box 60 that decodes the video stream to component output.

Various probes 64, 66, 68, 70 are deployed at potential encrypted and unencrypted locations in the network 10. Probes 64, 66 are capable of collecting unencrypted VCL information 71 since they both have access to unencrypted transport streams. Probes 68, 70 are capable of collecting only encrypted network layer parameters 73, since the transport stream is encrypted at both access locations. These probes send the VCL and network layer information to collector 72 to perform a correlation function, as described below.

Figure 3:
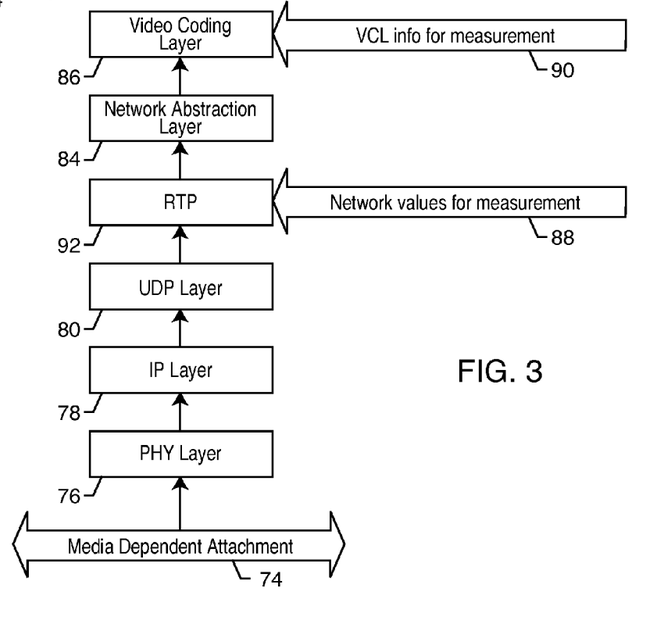
FIG. 3 shows a typical protocol stack where Video Coding Layer content is encapsulated in IP/UDP/RTP and values for both Network and Video Coding Layer statistics are extracted.

A protocol stack for a packetized video stream is illustrated in FIG. 2. Media dependent attachment 74 is an Ethernet, Sonet, DS3, cable, or DSL interface. A PHY chip 76 does the media dependent packet processing. IP Layer 78 is the network layer that provides addressing for packet routing in the IPTV network 10. A User Datagram Protocol (UDP) 80 is the transport layer that provides application level addressing for access ports. The video stream is encapsulated in the UDP/RTP or UDP layer 80. The encoded video could be compressed in MPEG 1/2/4 and sent as MPEG transport stream 82. The transport stream 82 contains the program information for audio, video and other information. Network Abstraction Layer 84 is typically present in H.264/AVC type of coding to seamlessly transport Video Coding Layer 86 information for transmission on the network 10. Network values for measurement 88 are extracted at the MPEG transport stream 82 layer. Video Coding Layer information for measurement 90 is extracted at the Video Coding Layer 86 specific to each codec. A protocol stack that uses RTP 92 instead of MPEG2 82 to convey program and timing information is shown in FIG. 3. For all other layers, the protocol stack in FIG. 3 is the same as the protocol stack depicted in FIG. 2.

Figure 4:
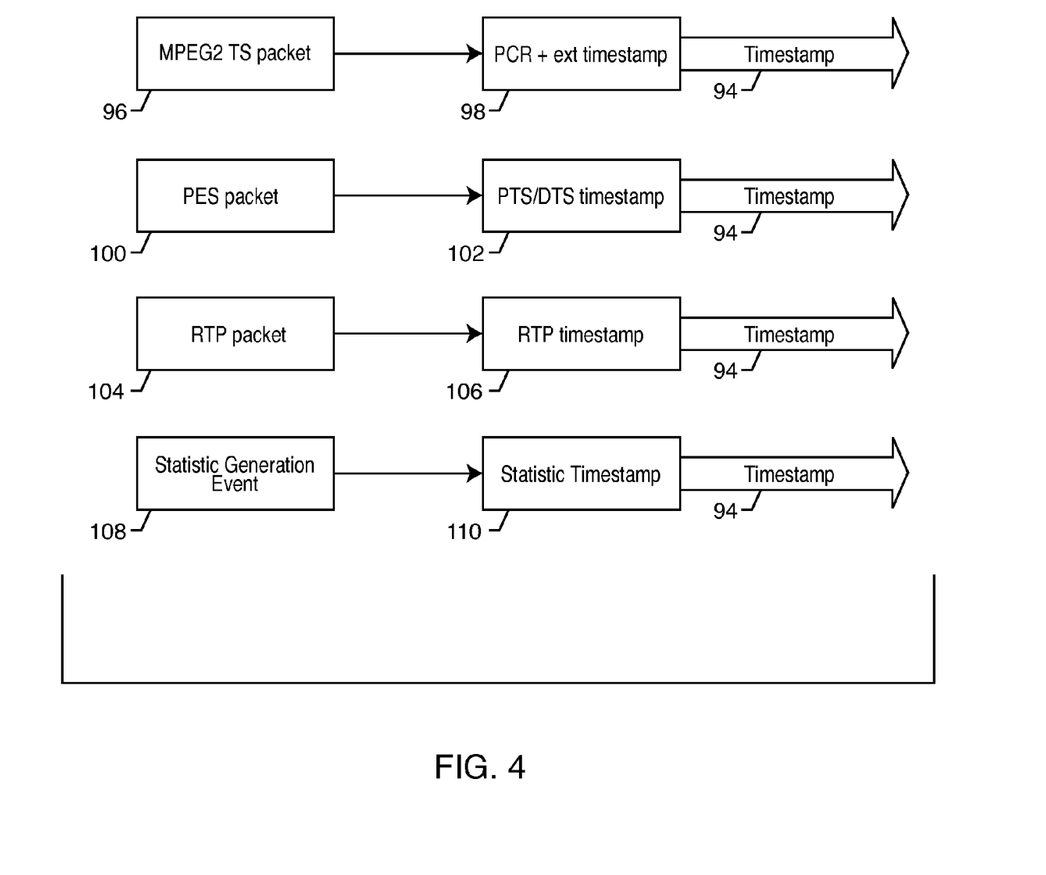
FIG. 4 shows the timing information options that are available to provide the correlation time.

FIG. 4 illustrates how packets are decoded to get a correlation timestamp 94. Only one timestamp is exported for correlation. The correlation timestamp preference order is PCR, PTS/DTS, RTP and statistics generation time (shown top to bottom) based upon availability. MPEG2 TS packet 96 provides the PCR timestamp 98. PES packet 100 provides the PTS/DTS timestamp 102. RTP packet 104 provides RTP timestamp 106. Statistics generation event 108 provides Statistics timestamp 110. The generated timestamps 98, 102, 106, 110 are processed according to the above stated preference to produce a single timestamp 94.

Figure 5:
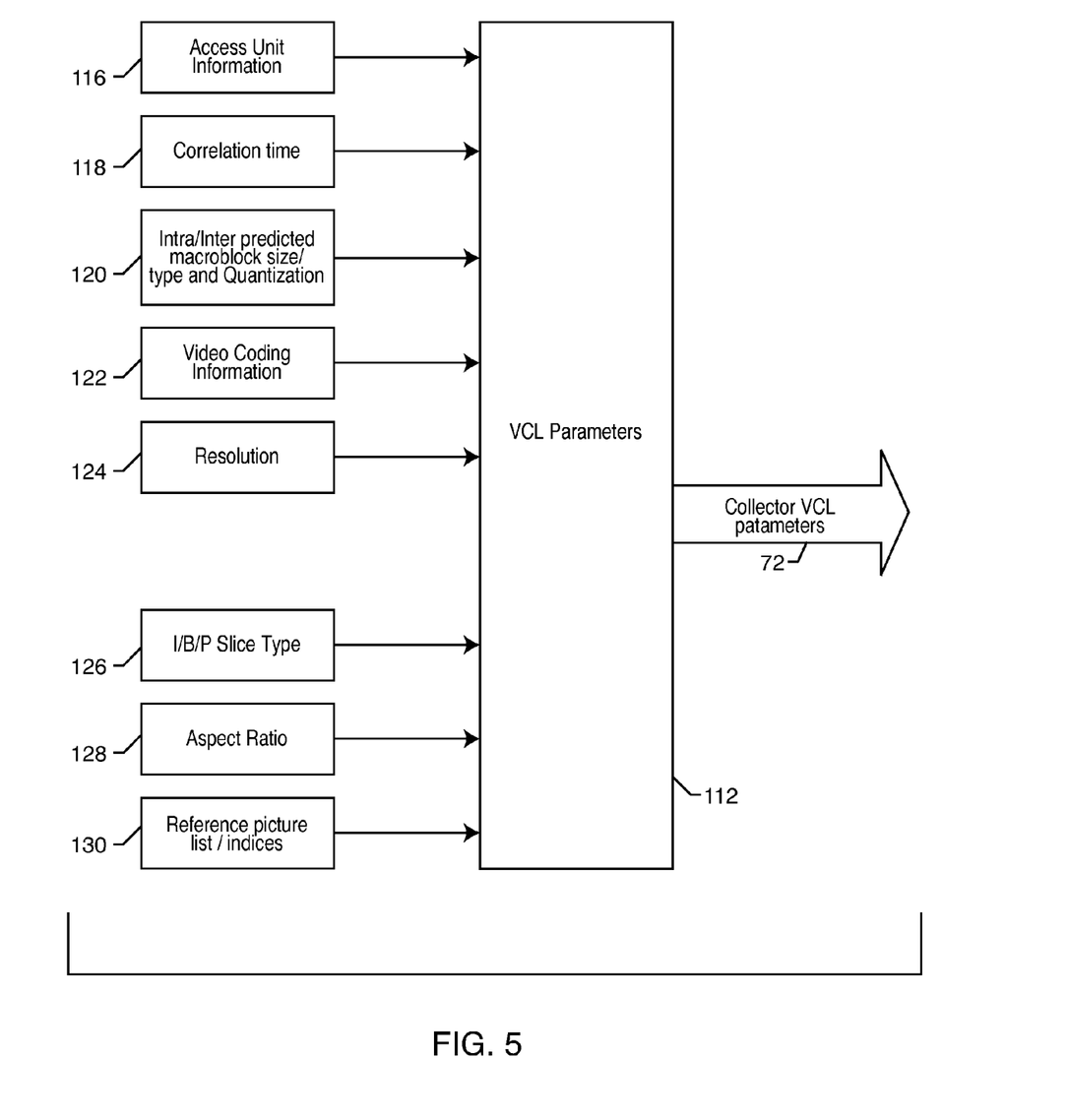
FIG. 5 shows the parameters gathered at the Head End location for Video Coding Layer information.

FIG. 5 illustrates the information 90 that is extracted from the Video Coding Layer 86 and transmitted as VCL parameters 112 to collector 72. Input to the VCL Parameters 112 includes: Access Unit Information 116; a correlation time base 118; Intra/Inter predicted macroblocks type, size (4×4, 8×4, 8×8 16×16) and quantization 120; video coding standard specific information 122; resolution of the screen in terms of pixels for horizontal and vertical sizes 124; I/B/P slices and type 126; the aspect ratio of the video 120 from parsing the coding layer; and reference picture list/indices 130. These parameters 112 are exported to the collector 72 at n (configurable) access units interval with the correlation time 118.

Figure 6:
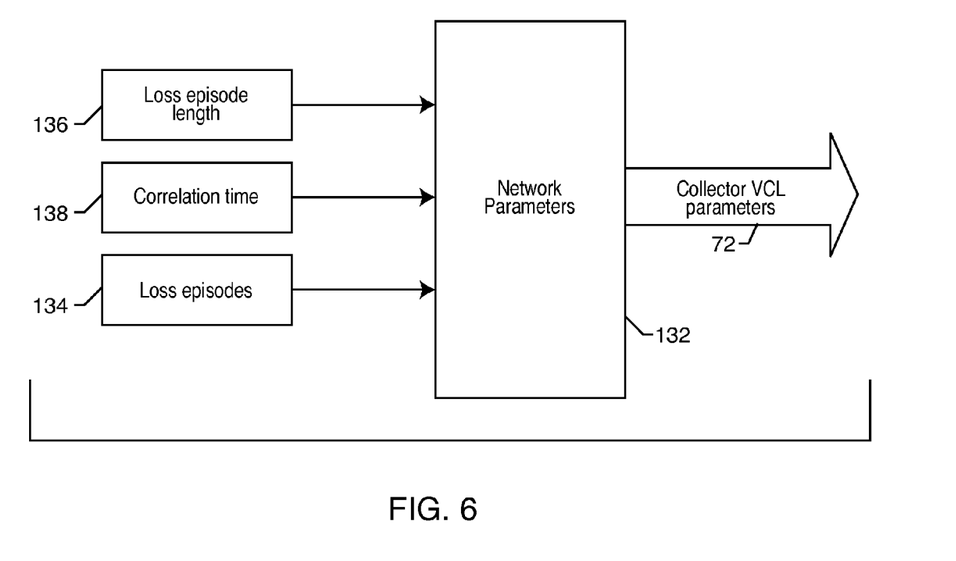
FIG. 6 show the parameters gathered at the down stream location for Network Layer information.

FIG. 6 illustrates the parameters 132 that are extracted at the Network Layer at the encrypted location. The parameters 132 include: an episode loss instance counter 134 at the transport stream level; a length of episode loss counter 136 measures the length of losses (bursty or single); and a correlation time 138 for each episode loss event. All of the network parameters 132 are collected and exported upon the occurrence of a loss event to the collector 72 with the correlation time 138.

Figure 7:
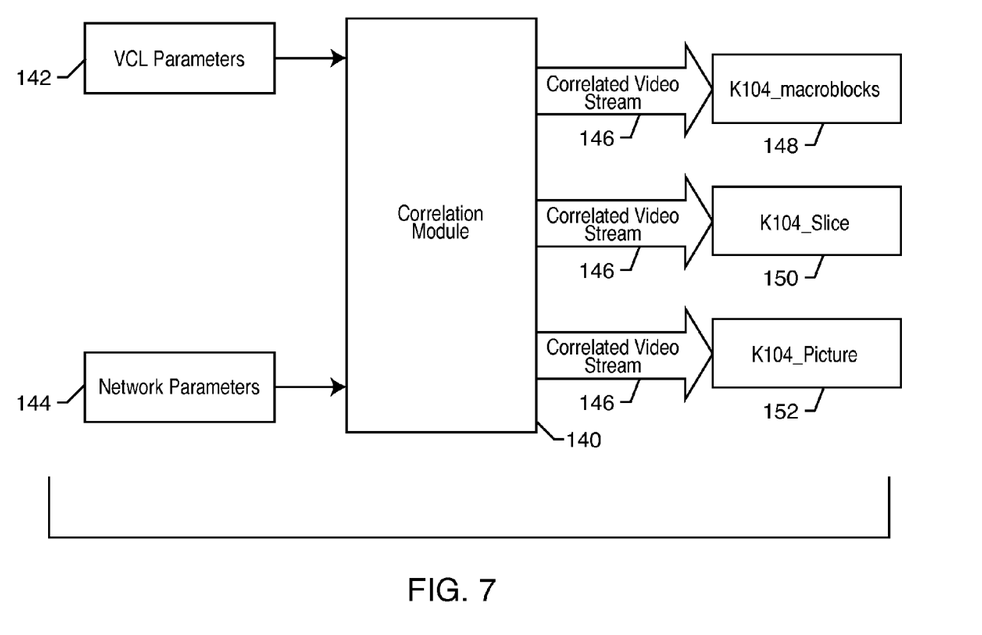
FIG. 7 shows the correlation module inputs at the collector that provides a correlated information output utilizing VCL and Network parameters.

FIG. 7 illustrates correlation module 140 inputs, VCL parameters coming from head end 142, and network parameters coming from down stream 144. The output, i.e. the correlated video stream 146, refers to a single stream that has both VCL and network layer information and spatial and temporal loss extent computed. K104_macroblock 148 gives the percentage of macroblocks affected. K104_slice 150 gives the percentage of slices affected. K104_picture 152 gives the percentage of pictures affected.

The operation of a preferred embodiment will now be explained with reference to the above described elements. At the location of probe 64—before the DRM servers 32, 34—the following operations are performed and the identified parameters are exported to the collector 72 for every n number of access units, where n is configurable in the system.

Initialize flow information for every video flow
Set E100=destination IP/port/program ID string;
Initialize variables for each access unit in the instance:
Set correlation time range A100 (low)=0; A106 (high)=0
Set Resolution of picture A103=0;
Set sequence number A101=0; for every transport payload size (188 bytes) from the access unit base time, increment sequence number for the VCL content RBSP (Raw byte sequence packet) to the macroblock level for every payload size;
Set IDR (Instantaneous Decoder Refresh) access unit A102=0; if available.
For each slice in access unit initialize following variables:
Set slice ID B100=0;
Set slice Type B101=unknown;
Set sequence number range for slice data to B102-B103=0.
For each macroblock per slice set the following:
Set macroblock type C100=unknown; it will be set to INTRA or INTER prediction later;
Set macroblock size C102=0;
Set sequence number range for macroblock data to C103-C107
Set reference index to the reference picture list to C104=0, this will index to the reference picture list associated with the n number of access units;
Set reference index to the macroblocks within reference picture to C105=0; this will be the macroblock index to the referring picture in the list;
Set a flag to indicate loss of macroblock to C106=false.
Initialize the reference picture list access units. For n number of access units a list of reference pictures are maintained, each reference picture structure will have following information associated with it:
Set correlation time range D100(low)=0; D104(high)=0;
Set sequence number range for the access unit in the reference picture to D102=0.

For each macroblock within reference picture;
Set sequence number range to D103=0;
Set a flag to indicate loss of the macroblock D104=false.
At every transport stream packet perform the following at the unencrypted probe 64 location:
For every access unit delimiter, get correlation time source, in either PCR or PTS; the present TS payload is assumed to be encrypted in this environment and only PCR is available as the correlation source;
Set F102=flow ID string;
Set A100=last PCR base+(number of bits time since last PCR to access unit delimiter bit)*37; Assumes 27 MHz clock base;
Set A106=last PCR base +(number of bits time since last PCR to access unit end delimiter bit)*37;
For every 188 bytes of access unit data increment A101;
For Slice Data RBSP start set B102=A101
Set Slice Data end RBSP B103=A101;
Set B100=slice_id;
Set B101=slice_type (I/B/P/SI/SP).
For every macroblock in slice set:
Set B101=A101 for macroblock start;
Set B107=A101 for macroblock end;
Set C102=macroblock_size;
Set C104=reference_index_picture_list;
Set C105=reference_index_picture;
Set C106=false; If a loss is encountered set it to true;
Set C108=quantization value for the macroblock;
Add the access unit to reference picture list if the encoder indicates;

At every n access units interval export the above values (reference+access units information) to collector (72) with the flow.

Initialize the following flow information for every video flow at encrypted location:
Set F100=destination IP/port/program ID string;
Set D100=0 to set PCR base of the lost TS packets—10 (configurable), this is to ensure that access unit boundary is matched;
Set D101-D102=0 to set the sequence number range for loss (burst or single);
Set D103=0 to set the loss event sequence number.

At every n (configurable) number of loss event (where a loss event is defined as an episode where a single or consecutive loss period lasts):
Set D100=store 10 PCR values before loss;
Set D104=last PCR base+number of bits time (from last PCR base to first payload in TS where last loss occurred) *37;
Set D103=0; At every loss event increment D103;
Set D101=D103 start loss; and
Set D102=D103 end of loss.

Export the above parameters to the collection point 72 with the flow information.

At the collector 72 gather parameters from encrypted and unencrypted locations and store them for analysis. The following analysis is performed to compute the spatial and temporal duration, slices/macroblocks affected by a loss.

Configure the collector 72 with a flow mapping from encrypted probes 68, 70 to probes 64, 66 to match the IP/port from encrypted to the unencrypted. At every unencrypted status event from probes 64, 66 maintain a list of access units and their associated reference picture list for the configured flow ID, up to a preconfigured number of access units. At every encrypted status event from probes 68, 70 match the flow ID to configuration with the access unit lists (E100); when a match with encrypted flow is found perform the following:
For each loss event find the access unit boundary;
Match the best fit access unit start time A100 with D100 in both access unit and reference picture list;
Set G100=D102-D101 as lost packets;
Set C106=true to indicate access unit loss;
K101++ to indicate access unit loss counter;

For every access unit base go through every slice and macroblock in the access unit list and reference picture list. Find the slices affected (INTRA slices) by the loss by performing the following:
Set do_more_slice=true;
While (do_more_slice)
G101=B103−B102;
If (G101>G100) the loss is within the slice else Do_more_slice=true;
Set K102++ to indicate slice loss;
Set G102=C107-C103;
While (G102—)
Set C106=true to indicate macroblock loss;
K103++ to indicate macroblock loss;
Spatial/temporal loss extent K104 is equivalent to the access unit where slices are intra/inter predicted and the macroblocks within the slices that are intra/inter predicted; i.e. K104_SLICE=(K102*100)/Total intra/inter predicted slices;
K104_macroblocks=(K103*100)/Total intra/inter predicted macroblocks;
K104_PICTURE=(K101*100)/Total intra/inter predicted access units.

If the slice or macroblocks are INTER predicted, the following procedure needs to be used to predict the macroblock from reference picture list to find if it was affected by loss. Within each slice go through the macroblocks if they are inter predicted;
While (G102—)
Get index C104, C105 of ref picture list;
If (reference_pic_list.macroblock flag C106 is set to true)
++K103; to indicate macroblock loss;

A quantization parameter can also be extracted from the macroblock information C108; after a correlation match is done. Although an embodiment has been described in detail for purposes of illustration, various modifications may be made to each without departing from the scope and spirit of the invention.

What is claimed is:

1. A process for determining spatial and temporal loss in a packet-based video broadcast system in an encrypted environment on a digital network, comprising the steps of:
    collecting video coding layer information with a corresponding timestamp at an unencrypted head end of a video stream using a first probe deployed at an unencrypted location in the digital network;
    simultaneously collecting network layer information with a corresponding timestamp at an encrypted downstream end of the video stream using a second probe deployed at an encrypted location in the digital network;
    exporting the video coding layer information with the corresponding timestamp to a collector in the digital network;
    transmitting the network layer information with the corresponding timestamp to the collector upon occurrence of a loss event;
    correlating the video coding layer information with the network layer information in the collector using the respective timestamps; and
    computing spatial and temporal loss in the video stream from the head end to the downstream end using the correlated information to determine impairments in the video stream from the loss event.

2. The process of claim 1, including the step of gathering information and parameters corresponding to discrete sections of the video stream during each of the collecting steps.

3. The process of claim 2, wherein the discrete sections of the video stream include access units, slices or macroblocks.

4. The process of claim 3, wherein the parameters in each access unit include correlation time, picture resolution, sequence number or instantaneous decoder refresh number.

5. The process of claim 3, wherein the parameters in each slice include slice identification, slice type or sequence number.

6. The process of claim 3, wherein the parameters in each macroblock include macroblock type, macroblock size, sequence number, reference index or loss flag.

7. The process of claim 1, wherein the step of simultaneously collecting network layer information comprises the step of creating a statistical model representing packet loss distribution information for the loss event in the video stream.

8. The process of claim 7, wherein the computing step comprises the step of computing spatial and temporal loss duration, and slices or macroblocks effected by the loss event.

9. The process of claim 1, wherein the computing step comprises the step of determining impairments in the video stream using the computed spatial and temporal loss.

10. The process of claim 1, wherein the computing step comprises the steps of:
  mapping the video coding layer information and the network layer information to match IP/port data from the downstream end to the head end of the video stream;
  maintaining an access unit list and an associated reference picture list at an unencrypted status event;
  matching the list of access units to an encrypted status event; and
  identifying lost packets in discrete sections of the access unit list and the associated reference picture list.

11. A process for determining spatial and temporal loss in a packet-based video broadcast system in an encrypted environment on a digital network, comprising the steps of:
  collecting video coding layer information with a corresponding timestamp at an unencrypted head end of a video stream using a first probe deployed at an unencrypted location in the digital network;
  simultaneously collecting network layer information with a corresponding timestamp at an encrypted downstream end of the video stream using a second probe deployed at an encrypted location in the digital network;
  creating a statistical model representing packet loss distribution information for a loss event in the video stream;
  exporting the video coding layer information with the corresponding timestamp to a collector in the digital network;
  transmitting the network layer information with the corresponding timestamp to the collector upon occurrence of the loss event;
  correlating the video coding layer information with the network layer information in the collector using the respective timestamps;
  computing spatial and temporal loss in the video stream from the head end to the downstream end using the correlated information and the statistical model; and
  determining impairments in the video stream from the loss event using the computed spatial and temporal loss.

12. The process of claim 11, including the step of gathering information and parameters corresponding to discrete sections of the video stream during each of the collecting steps.

13. The process of claim 12, wherein the discrete sections of the video stream include access units, slices or macroblocks.

14. The process of claim 13, wherein the parameters in each access unit include correlation time, picture resolution, sequence number or instantaneous decoder refresh number.

15. The process of claim 13, wherein the parameters in each slice include slice identification, slice type or sequence number.

16. The process of claim 13, wherein the parameters in each macroblock include macroblock type, macroblock size, sequence number, reference index or loss flag.

17. The process of claim 11, wherein the computing step comprises the step of computing spatial and temporal loss duration, and slices or macroblocks effected by the loss event.

18. The process of claim 11, wherein the computing step comprises the steps of:
  mapping the video coding layer information and the network layer information to match IP/port data from the downstream end to the head end of the video stream;
  maintaining an access unit list and an associated reference picture list at an unencrypted status event;
  matching the list of access units to an encrypted status event; and
  identifying lost packets in discrete sections of the access unit list and the associated reference picture list.

19. A process for determining spatial and temporal loss in a packet-based video broadcast system on a digital network in an encrypted environment, comprising the steps of:
  collecting video coding layer information with a corresponding timestamp at an unencrypted head end of a video stream using a first probe deployed at an unencrypted location in the digital network;
  simultaneously collecting network layer information with a corresponding timestamp at an encrypted downstream end of the video stream using a second probe deployed at an encrypted location in the digital network;
  gathering information and parameters corresponding to access units, slices or macroblocks of the video stream during each of the collecting steps;
  exporting the video coding layer information with the corresponding timestamp to a collector in the digital network;
  transmitting the network layer information with the corresponding timestamp to the collector upon occurrence of a loss event;
  correlating the video coding layer information with the network layer information in the collector using the respective timestamps;
  mapping the video coding layer information and the network layer information to match IP/port data from the downstream end to the head end of the video stream;
  maintaining an access unit list and an associated reference picture list at an unencrypted status event;
  matching the list of access units to an encrypted status event;
  identifying lost packets in discrete sections of the access unit list and the associated reference picture list; and
  computing spatial and temporal loss in the video stream from the head end to the downstream end using the correlated and mapped information, the matched access units and identified lost packet to determine impairments in the video stream from the loss event.

20. The process of claim 19, wherein the parameters in each access unit include correlation time, picture resolution, sequence number or instantaneous decoder refresh number.

21. The process of claim 19, wherein the parameters in each slice include slice identification, slice type or sequence number.

22. The process of claim 19, wherein the parameters in each macroblock include macroblock type, macroblock size, sequence number, reference index or loss flag.

23. The process of claim 19, wherein the step of simultaneously collecting network layer information comprises the step of creating a statistical model representing packet loss distribution information for the loss event in the video stream.

24. The process of claim 23, wherein the computing step comprises the step of computing spatial and temporal loss duration, and slices or macroblocks effected by the loss event.

25. The process of claim 19, wherein the computing step comprises the step of determining impairments in the video stream using the computed spatial and temporal loss.

* * * * *